(12) United States Patent
Isomura et al.

(10) Patent No.: US 7,526,119 B2
(45) Date of Patent: Apr. 28, 2009

(54) PATTERN INSPECTION APPARATUS

(75) Inventors: Ikunao Isomura, Yokohama (JP); Toru Tojo, Naka-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 686 days.

(21) Appl. No.: 10/720,136

(22) Filed: Nov. 25, 2003

(65) Prior Publication Data

US 2004/0126003 A1 Jul. 1, 2004

(30) Foreign Application Priority Data

Dec. 27, 2002 (JP) .............................. 2002-382264

(51) Int. Cl.
*G06K 9/00* (2006.01)

(52) U.S. Cl. ..................... 382/148; 382/141

(58) Field of Classification Search .................. 382/148
See application file for complete search history.

(56) References Cited

U.S. PATENT DOCUMENTS

| | | | | |
|---|---|---|---|---|
| 4,587,617 A | * | 5/1986 | Barker et al. ................ | 382/149 |
| 4,805,123 A | * | 2/1989 | Specht et al. ................ | 382/144 |
| 4,845,558 A | * | 7/1989 | Tsai et al. ................... | 348/126 |
| 5,699,447 A | * | 12/1997 | Alumot et al. .............. | 382/145 |
| 6,366,688 B1 | * | 4/2002 | Jun et al. .................... | 382/145 |
| 6,950,547 B2 | * | 9/2005 | Floeder et al. .............. | 382/143 |
| 2004/0126003 A1 | | 7/2004 | Isomura et al. | |

FOREIGN PATENT DOCUMENTS

JP 2002-139450 5/2002

OTHER PUBLICATIONS

U.S. Appl. No. 12/040,541, filed Feb. 29, 2008, Tsuchiya, et al.

* cited by examiner

*Primary Examiner*—Matthew C Bella
*Assistant Examiner*—Alex Liew
(74) *Attorney, Agent, or Firm*—Oblon, Spivak, McClelland, Maier & Neustadt, P.C.

(57) ABSTRACT

With a pattern inspection apparatus, image data corresponding to all patterns on an inspection target plate can be generated on the basis of scanned pattern data obtained with low-magnification optics different from ordinary inspection optics, or design pattern data. A pattern repeated area can be automatically detected from the image data. Therefore, die-to-die comparative inspection can be performed if the operator does not specify which dies to inspect. Thus, the inspection throughput can be improved.

22 Claims, 6 Drawing Sheets

PATTERN INSPECTION APPARATUS

CROSS-REFERENCE TO RELATED APPLICATIONS

This application is based upon and claims the benefit of priority from the prior Japanese Patent Application No. 2002-382264, filed Dec. 27, 2002, the entire contents of which are incorporated herein by reference.

BACKGROUND OF THE INVENTION

1. Field of the Invention

The present invention relates to a pattern inspection apparatus for inspecting pattern defects on a plate. More particularly, the present invention relates to a pattern inspection apparatus for inspecting defects of a very small pattern in, e.g., a photomask, wafer, or liquid crystal substrate used when fabricating a semiconductor device or liquid crystal display (LCD).

2. Description of the Related Art

The line width/spacing of a pattern constituting a large-scale integrated circuit (LSI) is changing from of the order of submicrons to nanometers, as is represented in 1-gigabit-class dynamic RAMs (DRAMs). One of the major factors that decrease the yield of the manufacture of LSIs is pattern defects in a photomask. The photomask is used when exposing and transferring an ultra-small pattern onto a semiconductor wafer by photolithography. In particular, as the pattern size of LSIs formed on semiconductor wafers shrinks, the size that must be detected as a pattern defect shrinks considerably. Hence, an apparatus that inspects such defects is under active development.

As the multimedia-oriented society progresses, the liquid crystal substrate size of LCDs is increasing toward 500 mm×600 mm or more. Also, the pattern of a TFT or the like to be formed on the liquid crystal substrate is shrinking. Accordingly, inspecting a very small pattern defect over a wide range is required. For this purpose, development of a pattern inspection apparatus that inspects a pattern defect in a photomask used when manufacturing a large-area LCD pattern and a large-area LCD within a short period of time efficiently is urgently needed.

Regarding a conventional photomask defect inspection apparatus, a die-to-database inspection scheme and a die-to-die inspection scheme are known (for example, see Jpn. Pat. Appln. KOKAI Publication No. 2002-139450). According to the die-to-database inspection scheme, a pattern on the mask is detected with inspection optics. Reference pattern data is obtained from design pattern data used in the fabrication of the mask. The detected pattern data and the reference pattern data are compared in accordance with an appropriate algorithm. The die-to-die inspection scheme is based on the premise that the photomask has a plurality of areas having the same patterns. Detected pattern data of the areas are compared to each other.

Usually, when die-to-die inspection is to be performed, the operator must specify in advance which dies are to be inspected from data acquired with optics. These optics can scan the pattern image of an inspection target object with a magnification of 1× to not more than about 100×. The operator must also instruct the origin coordinates, size, and the like of the die. This operation requires much labor and skill, leading to a decrease in inspection throughput.

Therefore, a pattern inspection apparatus that can perform die-to-die comparative inspection if the operator does not specify which dies are to be inspected, thus improving the inspection throughput, has been sought.

BRIEF SUMMARY OF THE INVENTION

According to a first aspect of the present invention, there is provided a pattern inspection apparatus which performs die-to-die inspection of comparing detected pattern data of one area with detected pattern data of another area among a plurality of repeated pattern areas, comprising:

first imaging optics which form a first optical image of a pattern formed on an inspection target plate on the basis of design pattern data;

a detected pattern data generator which detects the first optical image and generates first detected pattern data;

second imaging optics which form a second optical image of the pattern, the second imaging optics serving to scan an entire region of the pattern on the inspection target plate with an optical magnification lower than that of the first imaging optics;

a low-resolution image data generator which generates second detected pattern data corresponding to the entire region of the pattern on the inspection target plate by using the second optical image;

a repeated pattern area detector which detects the plurality of repeated pattern areas from the second detected pattern data; and a comparator which sequentially compares the first detected pattern data corresponding to the plurality of repeated pattern areas detected by the repeated pattern area detector in accordance with die-to-die comparison.

According to a second aspect of the present invention, there is provided a pattern inspection apparatus which performs die-to-die inspection of comparing detected pattern data of one area with detected pattern data of another area among a plurality of repeated pattern areas, and die-to-database inspection of comparing the detected pattern data with reference pattern data obtained from design pattern data, comprising:

first imaging optics which form a first optical image of a pattern formed on an inspection target plate on the basis of the design pattern data;

a detected pattern data generator which detects the first optical image and generates the detected pattern data;

a repeated pattern area detector which generates image data of an entire region of the pattern from the design pattern data with a pixel size corresponding to a first optical magnification lower than an optical magnification of the first imaging optics, and detects the plurality of repeated pattern areas from the image data; and a comparator which sequentially compares a plurality of detected pattern areas on the second detected pattern data corresponding to the plurality of repeated pattern areas detected by the repeated pattern area detector in accordance with die-to-die comparison.

According to a third aspect of the present invention, there is provided a pattern inspection apparatus which performs die-to-die inspection of comparing detected pattern data of one area with detected pattern data of another area among a plurality of repeated pattern areas, and die-to-database inspection of comparing the detected pattern data with reference pattern data obtained from design pattern data, comprising:

imaging optics which form an optical image of a pattern formed on an inspection target plate on the basis of the design pattern data;

a detected pattern data generator which detects the optical image and generates the detected pattern data;

a repeated pattern area detector which analyzes layout information of the design pattern data and detects the plurality of repeated pattern areas; and a comparator which sequentially compares a plurality of detected pattern areas on the second detected pattern data corresponding to the plurality of repeated pattern areas detected by the repeated pattern area detector in accordance with die-to-die comparison.

DETAILED DESCRIPTION OF THE INVENTION

According to the present invention, image data corresponding to the entire pattern region on the plate is generated based on scanned pattern data obtained with low-magnification optics or design pattern data. Repeated areas can be extracted automatically on the basis of the image data. Therefore, the operator need not perform a cumbersome operation as a pre-process for performing die-to-die comparative inspection. The inspection throughput can thus be improved.

The embodiments of the present invention will be described with reference to the accompanying drawings.

First Embodiment

Figure 1:
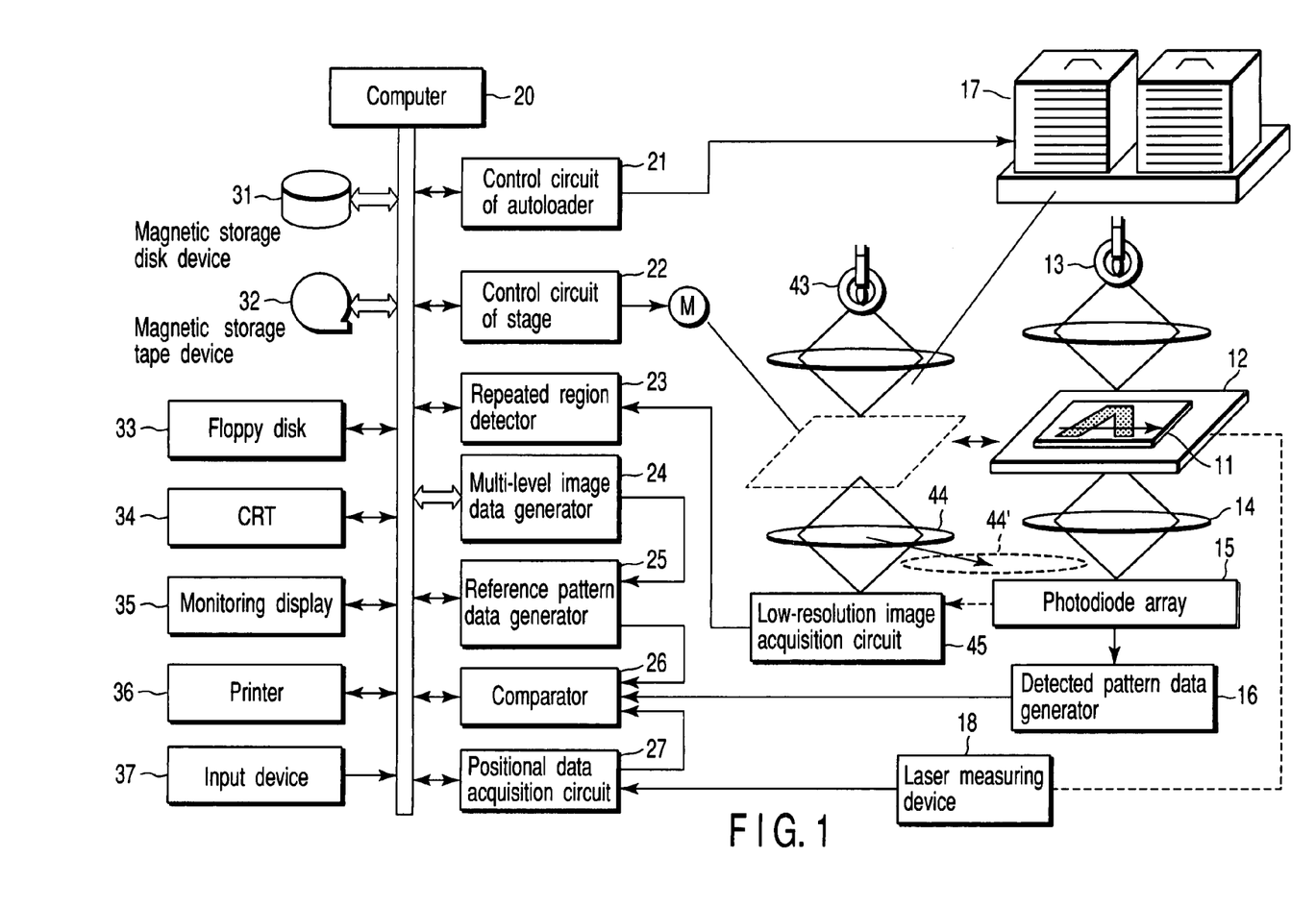
FIG. 1 is a view showing the system configuration of a pattern inspection apparatus according to the first embodiment.

FIG. 1 is a schematic view showing the system configuration of a pattern inspection apparatus according to the first embodiment of the present invention.

Figure 2A:
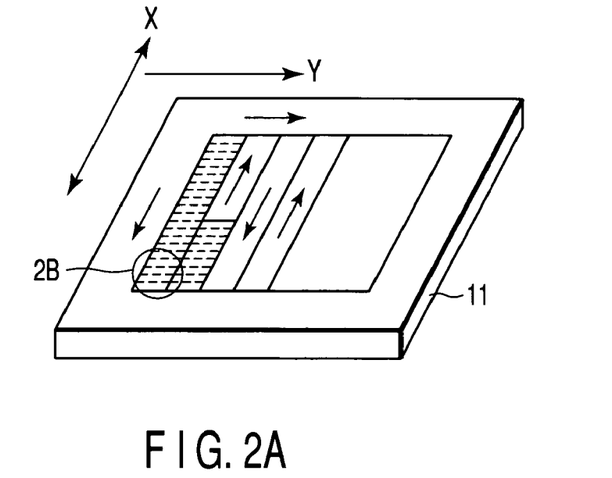
FIG. 2A is a schematic overall view for explaining inspection stripes of a photomask.
Figure 2B:
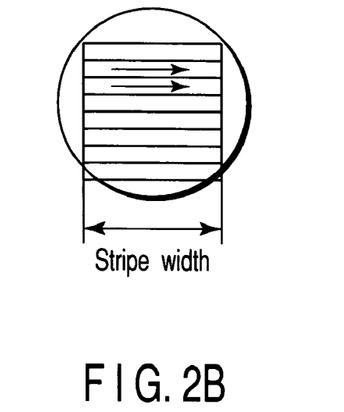
FIG. 2B is an enlarged view of the stripe of a portion 2B in FIG. 2A.

In this apparatus, an inspection target area formed on a photomask (inspection target plate) 11 is virtually divided into inspection stripes each with a width W as shown in FIGS. 2A and 2B. The inspection target area has a pattern. Inspection is performed by controlling the operation of a table where the photomask 11 is placed, such that the divided inspection stripes are scanned continuously.

The photomask 11 is placed on an X-Y-θ table 12 movable in the horizontal and rotating directions. The pattern formed on the photomask 11 is irradiated with light from an appropriate light source 13. The light transmitted through the photomask 11 becomes incident on a photodiode array 15 through magnification optics 14. At this time, the magnification optics 14 are controlled. Part of the stripe area of the virtually divided pattern as shown in FIG. 2B is formed on the photodiode array 15 as an enlarged optical image. In this manner, the light source 13 and magnification optics 14 form (first) imaging optics.

The pattern image formed on the photodiode array 15 is photoelectrically converted by the photodiode array 15. The converted pattern image is then subjected to analog-to-digital conversion with a detected pattern data generator 16. The photodiode array 15 and detected pattern data generator 16 make up a detected pattern data generator.

The X-Y-θ table 12 is driven by a control circuit 22 of the stage under the control operation of a computer 20. The moving position of the X-Y-θ table 12 is detected by a laser measuring device 18 and supplied to a positional data acquisition circuit 27. The photomask 11 on the X-Y-θ table 12 is transported by an autoloader 17 driven by an control circuit 21 of the autoloader.

The detected pattern data output from the detected pattern data generator 16 is sent to a comparator 26 together with data output from the positional data acquisition circuit 27. The latter data indicates the position of the photomask 11 on the X-Y-θ table 12.

The design pattern data used when forming the pattern on the photomask 11 is read out from a magnetic storage disk device 31 to a multi-level image data generator 24 through the computer 20. In the image data generator 24, the readout design pattern data is made into binary or multi-level image data (reference pattern data). The image data is sent to a reference pattern data generator 25.

The reference pattern data generator 25 subjects the figure image data sent to it to an appropriate filter process. The detected pattern data obtained by the detected pattern data generator 16 has been filtered by the resolution characteristics of the magnification optics 14, the aperture effect of the photodiode array 15, and the like. Hence, the design-side image data is also subjected to the filter process to match with the detected pattern data.

The comparator 26 compares the detected pattern data and the appropriately filtered design image data in accordance with an appropriate algorithm (die-to-database inspection). If the two data do not coincide, it is judged that a defect is present.

In FIG. 1, reference numeral 32 denotes a magnetic tape disk device; 33, a floppy disk; 34, a CRT; 35, a monitoring display; 36, a printer; and 37, an input device such as keyboard.

The X-Y-θ table 12 is driven by the control circuit 22, and is moved to the second position for die (repeated pattern area) extraction. The second position is different from the first position for pattern inspection. A light source 43 for irradiating the photomask 11 is provided above the second position. Magnification optics 44 (or 44') and a low-resolution image acquisition circuit (second imaging optics) 45 are provided below the second position. The low-resolution image acquisition circuit 45 has a CCD image sensor or the like.

The low-magnification optics formed of the light source 43, magnification optics 44, and image acquisition circuit 45 have a magnification smaller than that of the inspection optics formed of the light source 13, magnification optics 14, photodiode array 15, and detected pattern data generator 16. The low-magnification optics scan the pattern image of the inspection target object with a magnification of 1× to not more than about 100× to perform die-to-die comparison.

Assume that the low-magnification optics have only a specific optical magnification. In other words, assume that the image data of the entire inspection area can be generated by scanning operation of one to four (2×2) times. Then, it is difficult to detect a smaller area with a repeated pattern area detector 23 (to be described later). Thus, the stepwise high-magnification magnification optics 44' (only single optics are shown in FIG. 1) are also provided. This enables detection of a smaller repeated pattern area.

Image data corresponding to one mask obtained with the low-magnification optics is an image with 1,000 to not more than 2,000 pixels square. A small pattern shape which is actually formed cannot be discriminated. A pattern shape that can be discriminated may be a very large one. At the best, merely the black-and-white duty ratio of the pattern may be obtained from the gray scale (brightness) of the image. Therefore, first, a repeated pattern area candidate may be searched from this image (rough search). After that, a repeated pattern area is discriminated from the image data acquired with a high magnification.

The image acquired by the image acquisition circuit 45 is supplied to the repeated pattern area detector 23. The repeated pattern area detector 23 detects a repeated pattern area in order to determine which dies to inspect with an algorithm to be described later.

Figure 3:
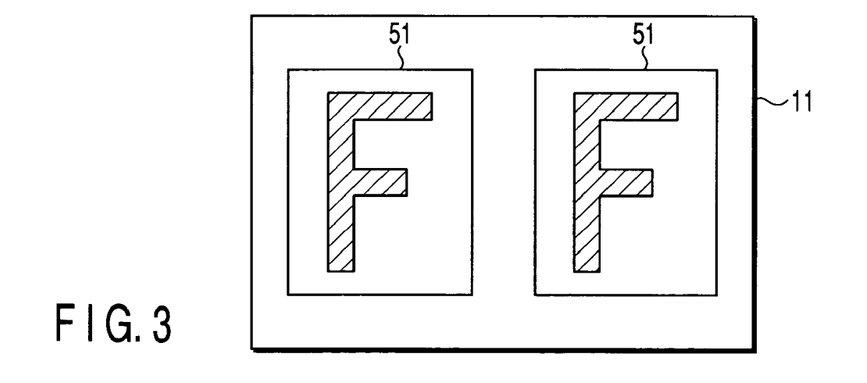
FIG. 3 is a plan view of a photomask having two repeated areas.
Figure 4:
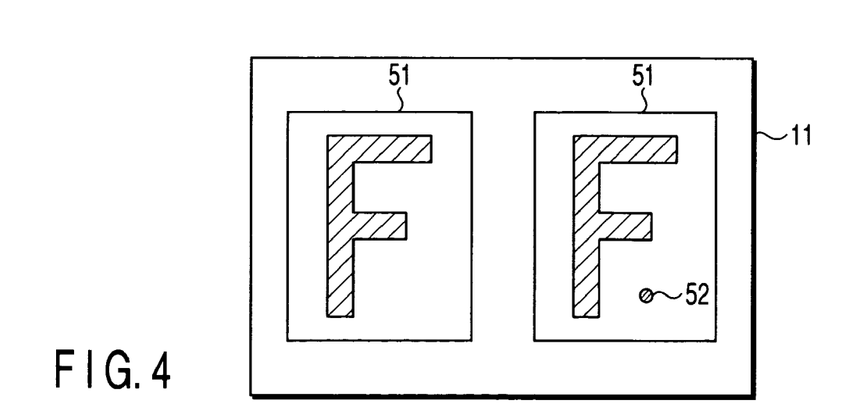
FIG. 4 is a plan view of a photomask showing a case of FIG. 3 where a defect exist.

With this apparatus, as shown in FIG. 3, on the premise that the photomask 11 has a plurality of areas 51 having the same patterns, detected pattern data are compared to each other (die-to-die inspection). If one area 51 has a defect 52 as shown in FIG. 4, this area 51 is detected as a defect. Alternatively, instead of a comparison between the detected patterns of the two areas 51, reference pattern data obtained from the design pattern data and the detected pattern data may be compared.

When performing die comparative inspection, the image data of the entire inspection area is generated by using low-magnification optics that can scan the pattern image of the inspection target object with a magnification of ×1 to not more than about ×100. If the image data can be generated with one scanning operation, the scanning may be done with one operation. Alternatively, the image data may be generated by re-synthesis from images divisionally scanned over a plurality of times. The apparatus has a function of detecting areas, which are presumed to be formed using common design pattern data, from the thus generated image data, that is, the repeated pattern area detector 23. This is the characteristic feature of the present invention.

The flow of the actual operation will be described with reference to the flowchart of FIG. 5.

First, the full mask image is acquired with a low-magnification camera (low-magnification optics; 44 and 45 of FIG. 1) (step S1). The image data to be generated, which corresponds to one mask, is of an image with 1,000 to 2,000 pixels square at most. The actually formed small pattern shape need not be discriminated.

The repeated pattern area detector 23 performs rough search of an area that can be determined as a repeated area by using the image data (step S3). In step S3, the original multi-level image data may be processed as it is. If the image data is made into binary expression (step S2), search can be simplified. Note that step S2 can be omitted.

With rough search, the image data is totally searched by using, e.g., a window with about 3×3 pixels. Primary repeated area candidates are thus searched (step S4). If the size of one pixel of the mask image data is enlarged, the total number of pixels decreases, and accordingly the detection time decreases. If the size of one pixel is excessively large, a comparatively small repeated pattern area cannot be detected. The pixel size must be set in accordance with the size of the repeated areas to be detected.

If the size of one pixel is not enlarged, the detection time can be shortened by limiting the repeated pattern areas to be detected to a certain degree. For example, the repeated pattern areas are often rectangular areas each with 1 mm square or more (for example, see FIG. 6 to be described later). If the shape and the lower limit of the size of the areas to be detected by the repeated pattern area detector 23 are set, the detection time decreases. This notion in setting the repeated pattern areas can be applied to the second to fifth embodiments to be described later.

In the above example, the portion having the two-dimensional pattern is fully searched. According to another way of rough search, in place of this, a candidate may be estimated by using the cross-sectional profiles in X or Y one-dimensional direction from the mask image data.

Subsequently, the size of the inspection area is measured (step S5). It is practical to set a threshold value in advance and to exclude an area with an excessively small size.

If the inspected area is approximately estimated as a repeated area, the optics is switched to the high-magnification optics (the magnification optics 44 of FIG. 1 is switched to 44'). Image data is re-acquired (step S6). It is preferable that the high-magnification optics can specify the inspection start position and end position. Depending on the case, an inspection optics may be also used as the high-magnification optics.

Subsequently, the repeated pattern area detector 23 finely searches the inspection start position and end position. This search is done on the basis of the image data re-acquired by the low-resolution image acquisition circuit 45 (step S7). The coincidence degree between the areas is judged (step S8). If it is judged that the areas coincide (step S9), the repeated pattern area candidates are all registered in the memory or the like as repeated pattern areas (step S10). The repeated pattern area candidates may be registered in the repeated pattern area detector 23. Alternatively, they may be stored in the memory of the computer 20.

Since the repeated pattern areas are estimated from the optically scanned image, the images do not completely coincide. With the process of judging the area coincidence degree, evaluation is performed by pattern matching with respect to the pitch, the size, and the coincidence degree of the pattern areas.

Sometimes, the full mask is not optically uniformly irradiated, and images that are acquired under different image acquisition conditions must be compared. Therefore, the threshold value of the coincidence degree for evaluation must be variable and must be able to be adjusted differently for different apparatuses. If the irradiating conditions are reproducible, data processed by considering the data on the irradiating conditions should be input to the repeated pattern area detector 23.

The searched area is subjected to die-to-die comparative inspection by using the inspection optics and the comparator 26. This is the same as in the conventional case. More specifically, the pattern having the repeated pattern areas is detected with the inspection optics on the basis of the information on the repeated pattern areas registered in the memory in the above manner. The detected pattern data of one pattern area and that of another pattern area are compared (step S11). The inspection results are registered (step S12). Whether there is any un-inspected area is judged (step S13). All inspection areas are inspected in this manner.

Figure 6:
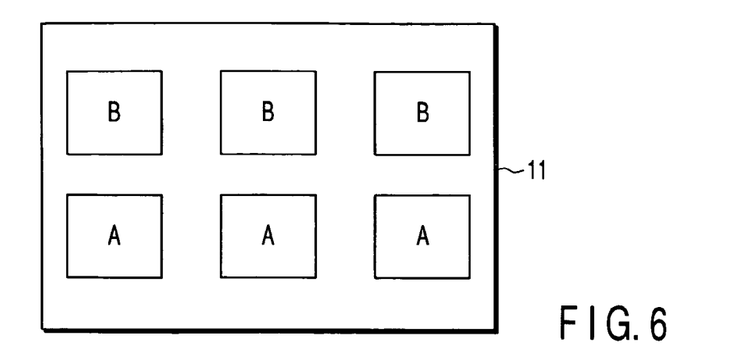
FIG. 6 is a schematic view showing an example of the arrangement of pattern regions on the photomask.

For example, in a photomask 11 having "A areas" and "B areas" as shown in FIG. 6, registration is performed to compare A areas with each other and B areas with each other. Inspection is performed, and the inspection results are registered.

In the process of judging the area coincidence degree, if the "A areas" and "B areas" are unfortunately judged as areas formed using the same data, defects occur frequently. In this case, the inspection must be stopped. Which areas are to be compared afterwards must be reconstructed. The apparatus should be able to deal with this situation as well.

Assume that a certain area is judged once as a repeated area with the repeated pattern area detector and is then actually inspected to prove that it is not. That is, the judgment is reversed. In this case as well, the judgment history should be recorded.

When die-to-die comparative inspection is to be performed for areas detected by the repeated pattern area detector 23, the positions of the dies must be aligned with precision of about several pixels or less. Assume that the optical function only has a certain low magnification, such as 1× to not more than 100×, to scan the pattern image of the inspection target object. In other words, the image data of the entire inspection area can be generated by scanning operation of one to four (2×2) times. In this case, alignment is difficult.

In view of this, the low-magnification optics must have both a low-magnification scanning function and a high-magnification scanning function. Then, the repeated areas can be detected with the low-magnification scanning function, and their inspection start positions can be substantially specified with the high-magnification scanning function.

This embodiment has single inspection optics. For die-to-die comparison, a memory that can store one of detected pattern data obtained with the inspection optics may be loaded in the comparator 26. Alternatively, double inspection optics may be provided. The image of the left pattern may be acquired with one inspection optics. The image of the right pattern may be acquired with the other of the inspection optics. Then, the two images may be compared.

In this manner, according to this embodiment, the repeated areas for die-to-die comparative inspection which are conventionally specified by the operator can be discriminated automatically. Therefore, the convenience can be increased greatly, and the inspection throughput can be increased considerably.

To effectively implement this embodiment, the following items can be set:
(1) The periphery of any repeated pattern in a repeated pattern area to be searched should be designed as a light-blocking or light-transmitting portion having a uniform pattern.
(2) Regarding a searched repeated pattern area, its image is enlarged with the second high-magnification image acquisition portion, and its pattern edge is specified.
(3) Regarding the searched repeated pattern area, its image is acquired with an optical magnification used for actual inspection, and its pattern edge is specified.
(4) Regarding the searched repeated pattern area, whether it is a repeated pattern area is finally judged from the number of defects or the area of defects detected by actual inspection.
(5) The final judgment of being a repeated pattern area is recorded.

Second Embodiment

Figure 7:
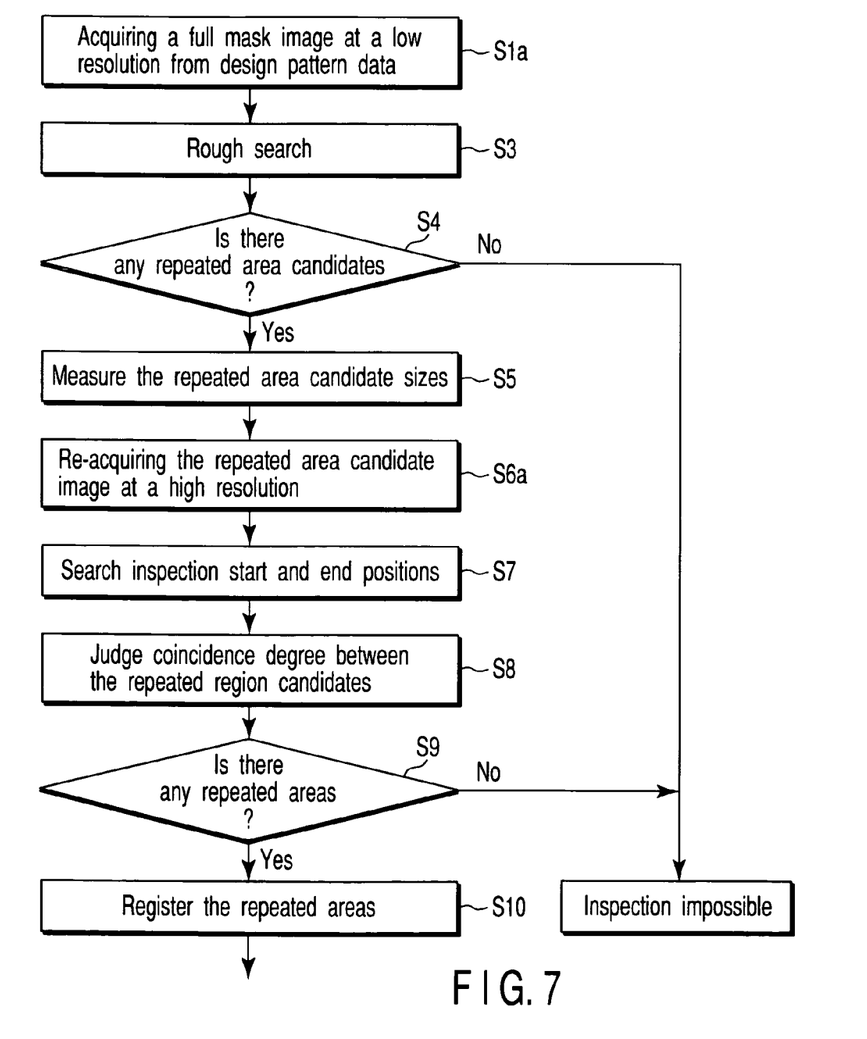
FIG. 7 is a flowchart for explaining the operation of repeated pattern area detection in the second embodiment, and illustrates a case wherein repeated pattern area candidates are to be detected using design pattern data.

FIG. 7 is a flowchart for explaining a pattern inspection apparatus according to the second embodiment of the present invention, and illustrates repeated pattern area detection using design pattern data.

FIG. 7 is different from FIG. 5 in the following respects. In place of steps S1 and S2, the full mask image is acquired at a low resolution (step S1a). In place of step S6, the image is re-acquired at a high resolution (step S6a). In FIG. 7, steps after area registration (S10) are the same as those of FIG. 5 and are accordingly omitted.

In the second embodiment, low-magnification optics are not used. The entire configuration of the pattern inspection apparatus is the one obtained by excluding the light source 43, magnification optics 44, and low-resolution image acquisition circuit 45 from FIG. 1. As the configuration is omitted only partly, FIG. 1 can be applied to the second embodiment (and the following embodiments) as well.

Figure 5:
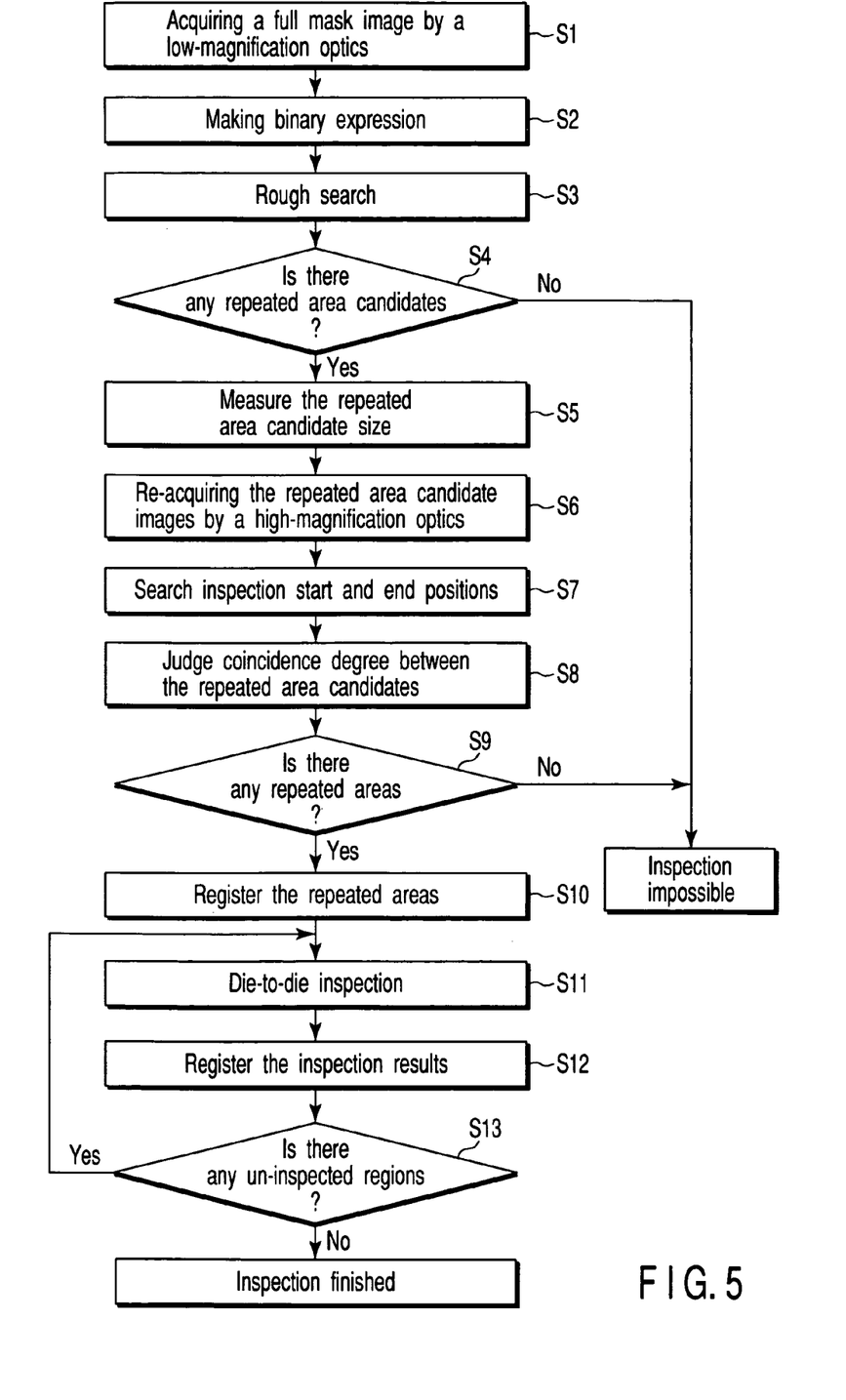
FIG. 5 is a flowchart showing the operation of repeated pattern area detection in the first embodiment.

In the embodiment of FIG. 5, the image data of the entire inspection area is generated by using low-magnification optics that can scan the pattern image of the inspection target object. If design pattern data exists, image data corresponding to the entire inspection area can be generated from the design pattern data (step S1a). In this case, a repeated pattern area detector 23 generates the image data. Alternatively, a computer 20 may generate the image data, or a multi-level image data generator 24 may generate the image data by enlarging the pixel size to be developed. In this embodiment, these generation schemes are combined to form what is called a repeated pattern area detector.

In the second embodiment, when the image is to be re-acquired as well, corresponding image data is generated from the design pattern data (step S6a). After image data corresponding to one mask is generated, a process equal to that of FIG. 5 is performed.

An optically scanned image is not reproducible in a strict sense. In contrast to this, an image generated from design pattern data is reproducible and a repeated area can be detected from it more correctly. Also, it is advantageous that the image generated from the design pattern data can be obtained through off-line detection before an inspection target plate is placed on the stage.

Third Embodiment

Figure 8:
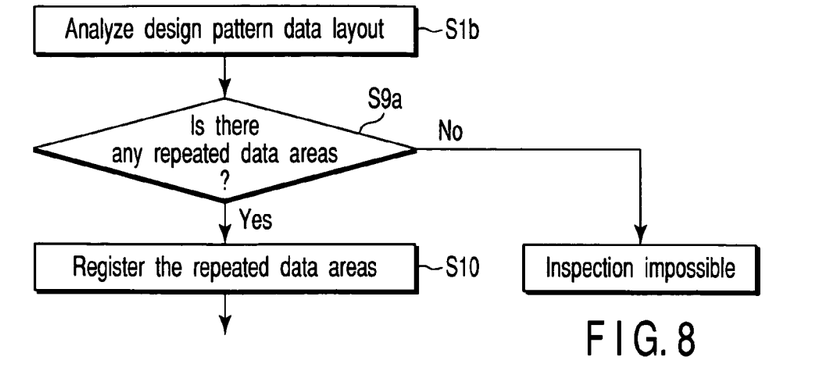
FIG. 8 is a flowchart for explaining the operation of repeated pattern area detection in the third embodiment, and illustrates a case wherein repeated pattern area candidates are to be detected from design pattern data.

FIG. 8 is a flowchart for explaining a pattern inspection apparatus according to the third embodiment of the present invention, and illustrates repeated pattern area detection using design pattern data. The entire apparatus configuration is the same as that of the second embodiment. Low-magnification optics are not needed.

According to the third embodiment, mask image data is not generated from design pattern data as in the second embodiment. Rather, the pattern layout information included in the design pattern data is utilized. More specifically, a repeated pattern area detector 23 analyzes the pattern layout from the design pattern data (step S1b), and judges whether the patterns are included in the same data area (step S9a). If the patterns are included in the same data area, this data area is registered as a repeated pattern area (step S10). If it is obvious that the patterns are generated from the same file, it can be determined that the area including them is surely a repeated pattern area.

In this manner, according to the third embodiment, the same effect as that of the first embodiment described above can naturally be obtained. Moreover, repeated pattern areas for die-to-die comparison can be searched more easily.

Fourth Embodiment

In the first to third embodiments, an image generated from an optical image and an image generated from design pattern data are used separately. These two images can be used together. The design pattern data is reproducible and is correct in a certain sense. A pattern on an actual inspection target plate, however, has a slight shift from the design value. This shift can be corrected by using an image generated from an optical image.

Figure 9:
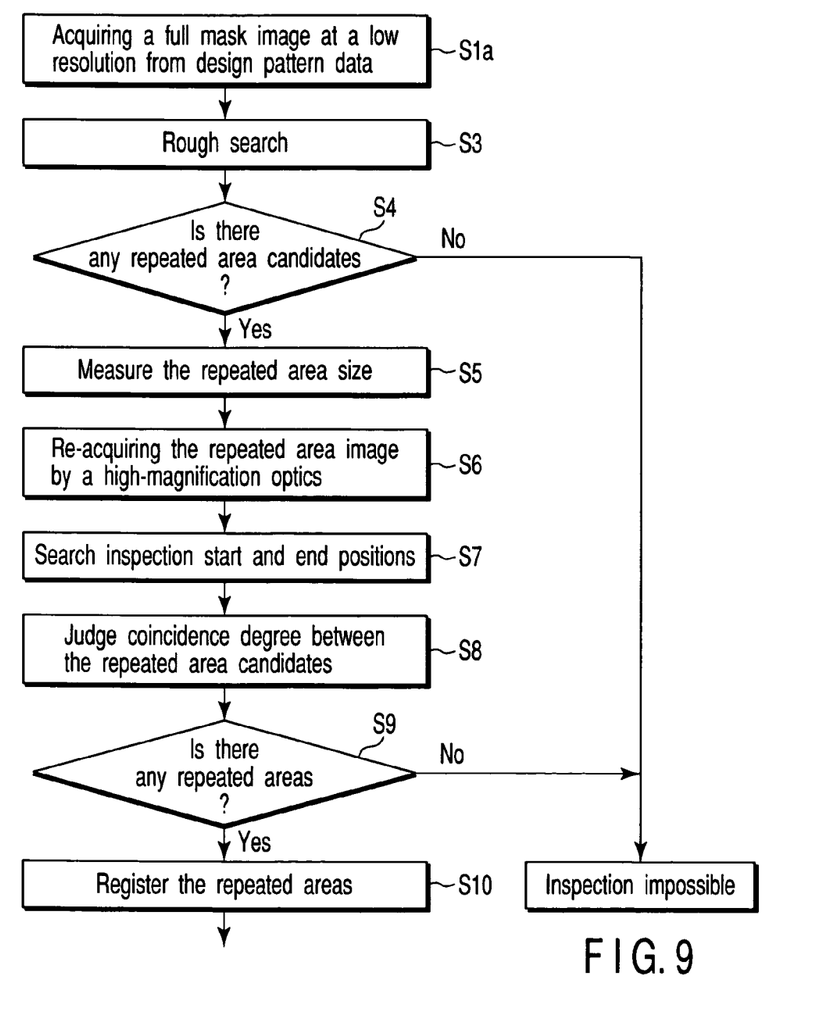
FIG. 9 is a flowchart for explaining the operation of repeated pattern area detection in the fourth embodiment, and illustrates a case wherein repeated pattern areas are to be detected from design pattern data and low-resolution image.

FIG. 9 is a flowchart for explaining a pattern inspection apparatus according to the fourth embodiment of the present invention, and illustrates repeated pattern area detection.

This embodiment performs a repeated pattern area detection flow in which FIGS. 5 and 7 are combined. The difference between this detection and the above detection is as follows. Rough search is performed by using design pattern data (step S1a). Fine search is performed by using a high-resolution (high-magnification) camera in low-magnification optics, or a camera in inspection optics (step S6).

Even when a high-resolution camera is used in fine search, in actual inspection, sometimes the user may want alignment more strictly with precision of one pixel or less. In this case, inspection may be performed once with an appropriate inspection stripe, and a positional error amount may be calculated. Then, alignment may be performed. Alternatively, inspection may not be performed at all, and detection data of the corresponding stripe may be acquired in a memory. Then, a positional error amount may be calculated from the data.

As the stripe of which data is to be acquired, a portion near the center of a detected repeated pattern area may be simply selected. If, however, this portion does not accidentally include fine stripes, it is not preferable. Hence, it is preferable to judge whether the pattern is fine or not from the brightness of the mask image data and to select a stripe which is estimated to be comparatively fine.

If, unfortunately, the lines run only in the X or Y direction, alignment in either X or Y direction may be sometimes impossible. In this case, data acquisition for alignment must naturally be performed again with another stripe.

Even if it is judged by the repeated pattern area detector that areas in question are generated from the same design pattern data, actually, they may be possibly generated from different design pattern data. In this case, with inspection, defects would occur frequently. This can be imagined easily. In view of this, at least one stripe should be inspected, and whether the area in question is a repeated pattern area should be judged. Defects may occur frequently due to a positional error or the like. In this case, realignment may be performed, and after that inspection may be performed. If defects occur frequently yet, inspection of the portion in question should be stopped halfway.

Fifth Embodiment

Actually, die-to-die inspection is often performed for rectangular areas as shown in FIG. 4. The repeated pattern area detector 23 can accordingly be simplified if only rectangular areas are to be detected. Assume that a condition is added that no data exists in the inspection area other than a die that is to be inspected. Then, detection of repeated pattern areas can be simplified very much. Even when any data should exist, if the pattern shape or size is known in advance, it can be used as a mark contrary.

Figure 10:
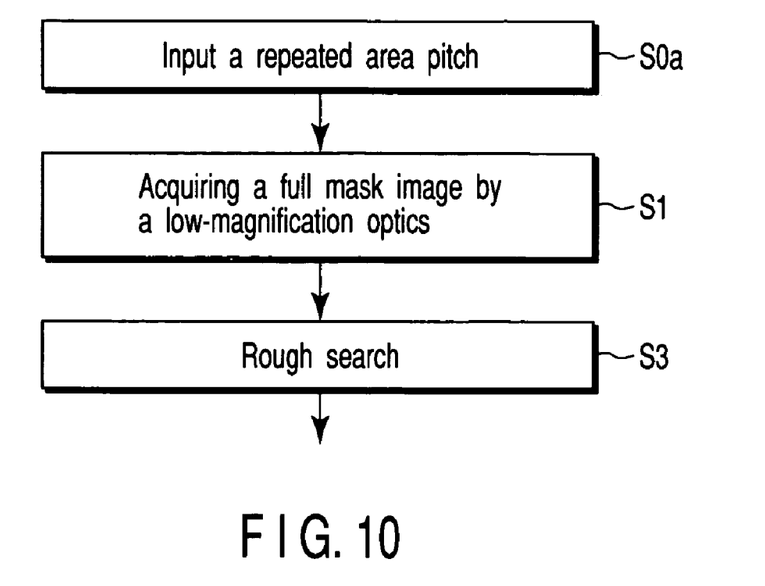
FIG. 10 is a flowchart for explaining the operation of repeated pattern area detection in the fifth embodiment, and illustrates a case wherein repeated pattern region candidates are to be detected from the repeated pattern area pitch.

As shown in FIG. 10, it is practical to input from the input device 37 (FIG. 1) a condition that the size or pitch of the repeated pattern area is already known, thus simplifying the detection algorithm (step S0a). This information may be included in the program instead of being input by the operator.

If such information is known in advance, a repeated pattern area can be easily detected from a one-dimensional cross-sectional profile. In this case, if a filter process or the like is added, the pattern can be smoothed, making detection easier.

Figure 11:
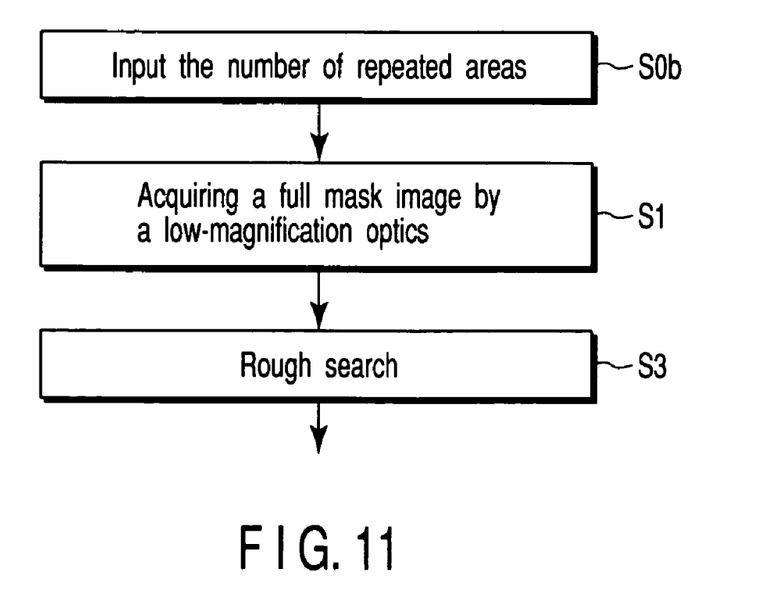
FIG. 11 is a flowchart for explaining the operation of repeated pattern area detection in the fifth embodiment, and illustrates a case wherein repeated pattern area candidates are to be detected from the number of repeated pattern areas.

Assume that the location of the repeated pattern area is unknown. Even so, as shown in FIG. 11, if the number of dies is known, e.g., if it is known that how many dies are arrayed in the X and Y directions, this data may be input from the input device 37 (step S0b). Thus, the pitch can be estimated easily.

(Modification)

The present invention is not limited to the embodiments described above. In the above embodiments, the inspection target plate is exemplified by a photomask. However, the present invention is not limited to this, but can be applied to pattern defect inspection of a semiconductor wafer or liquid crystal substrate. Conditions such as the arrangement and magnification of the low-magnification optics can be appropriately changed in accordance with the specification. The algorithm for searching the repeated area is not limited to the flowcharts shown in FIGS. 5 and 7 to 10, but can be appropriately changed in accordance with the specification.

As has been described above in detail, according to the present invention, image data corresponding to all patterns on an inspection target plate can be generated on the basis of scanned pattern data obtained with low-magnification optics or design pattern data. A pattern repeated area can be detected from the image data. Therefore, comparative die inspection can be performed if the operator does not specify which dies to inspect. Thus, the inspection throughput can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus which performs die-to-die inspection of comparing detected pattern data of one area with detected pattern data of another area among a plurality of repeated pattern areas, comprising:

first imaging optics which forms first optical image of a pattern formed on an inspection target plate on the basis of design pattern data;

a detected pattern data generator which detects the first optical image and generates first detected pattern data;

second imaging optics which forms second optical image of the pattern, the second imaging optics serving to scan an entire region of the pattern on the inspection target plate with an optical magnification lower than that of the first imaging optics;

a low-resolution image data generator which generates second detected pattern data corresponding to the entire region of the pattern on the inspection target plate by using the second optical image;

repeated pattern area detector which detects whether candidates for the plurality of repeated pattern areas exist in the second detected pattern data by performing rough search of the second detected pattern data, measures area sizes of the candidates if the candidates exist; and a comparator which sequentially compares the first detected pattern data corresponding to the plurality of repeated pattern areas detected by the repeated pattern area detector through the second imaging optics in accordance with die-to-die comparison, wherein, after the second imaging optics forms the second optical image of the pattern, the low-resolution image data generator generates the second detected pattern data corresponding to the entire pattern region using the second optical image, the repeated pattern generator detects if the candidates exist, the first imaging optics forms the first optical image of the candidates, the detected pattern data generator generates the first detected pattern data of the candidates, and the comparator compares the first detected pattern data with die-to-die comparison.

2. An apparatus according to claim 1, wherein the repeated pattern area detector detects the plurality of repeated pattern areas by pattern matching on the basis of a similarity in a pattern layout of the second detected pattern data.

3. An apparatus according to claim 2, wherein the similarity in the pattern includes a pitch and size of the plurality of repeated pattern areas.

4. An apparatus according to claim 1, wherein the repeated pattern area detector further performs detection of the plurality of repeated pattern areas on the basis of the design pattern data.

5. An apparatus according to claim 1, wherein the repeated pattern area detector re-acquires image data of the pattern with a second optical magnification higher than that of a first optical magnification with which the sizes of the candidates are measured, within the detected area sizes, judges a coincidence degree of the candidates on the basis of the re-acquired image data, and registers the candidates, when judged to coincide, as the plurality of repeated pattern areas.

6. An apparatus according to claim 5, wherein the second imaging optics has at least two optical magnifications which are to be switched, and the repeated pattern area detector re-acquires the image data of the pattern by switching the optical magnification of the second imaging optics to the second optical magnification, which is higher than the first optical magnification.

7. An apparatus according to claim 5, wherein the repeated pattern area detector re-acquires the image data of the pattern by using the first imaging optics.

8. An apparatus according to claim 1, wherein the repeated pattern area detector sets the plurality of repeated pattern areas to be detected to those having rectangular shapes.

9. An apparatus according to claim 8, wherein the repeated pattern area detector sets the plurality of repeated pattern areas to those having a size not smaller than 1 mm square.

10. An apparatus according to claim 1, wherein the repeated pattern area detector detects a size or number of the repeated pattern areas input in advance before detection operation, and thereafter starts the detection operation.

11. A pattern inspection apparatus which performs die-to-die inspection of comparing detected pattern data of one area with detected pattern data of another area among a plurality of repeated pattern areas, and die-to-database inspection of comparing the detected pattern data with reference pattern data obtained from design pattern data, comprising:

first imaging optics which form a first optical image of a pattern formed on an inspection target plate on the basis of the design pattern data;

a detected pattern data generator which detects the optical image and generates the detected pattern data;

a repeated pattern area detector which generates image data of an entire region of the pattern from the design pattern data with a pixel size corresponding to a first optical magnification lower than an optical magnification of the first imaging optics, and detects whether candidates for the plurality of repeated pattern areas exist in the design pattern data by performing rough search of the detected pattern data, measures area sizes of the candidates if the candidates exist; and a comparator which sequentially compares a plurality of detected pattern areas on the detected pattern data corresponding to the plurality of repeated pattern areas detected by the repeated pattern area detector in accordance with die-to-die comparison, wherein, the repeated pattern area generator generates the image data of the entire image region of the pattern from the design pattern data with a pixel size corresponding to the first magnification to detect if the candidates for the repeated pattern areas exist, the first imaging optics forms the first optical image of the candidates for the repeated pattern areas, the detected pattern generator detects the first optical image to generate the detected pattern data, and the comparator compares the detected pattern areas on the detected pattern data with the die-to-die comparison.

12. An apparatus according to claim 11, wherein the repeated pattern area detector re-acquires image data of the pattern with a second optical magnification higher than that of a first optical magnification with which the sizes of the candidates are measured, or with a pixel size corresponding to the second optical magnification within the detected area sizes, judges a coincidence degree of the candidates on the basis of the re-acquired image data, and registers the candidates, when judged to coincide, as the plurality of repeated pattern areas.

13. An apparatus according to claim 12, wherein the repeated pattern area detector re-acquires the image data from the design pattern data with the pixel size corresponding to the second optical magnification.

14. An apparatus according to claim 12, wherein
the apparatus further comprises a second imaging optics which forms a second optical image of the pattern, the second imaging optics having the second optical magnification higher than the first optical magnification, and
the repeated pattern area detector re-acquires the image data from the second optical image.

15. An apparatus according to claim 12, wherein the repeated pattern area detector re-acquires the image data from the first optical image of the first imaging optics.

16. An apparatus according to claim 11, wherein the repeated pattern area detector sets the plurality of repeated pattern areas to be detected to those having rectangular shapes.

17. An apparatus according to claim 16, wherein the repeated pattern area detector sets the plurality of repeated pattern areas to those having a size not smaller than 1 mm square.

18. An apparatus according to claim 11, wherein the repeated pattern area detector detects a size or number of the repeated pattern areas input in advance before detection operation, and thereafter starts the detection operation.

19. A pattern inspection apparatus which performs die-to-die inspection of comparing detected pattern data of one area with detected pattern data of another area among a plurality of repeated pattern areas, and die-to-database inspection of comparing the detected pattern data with reference pattern data obtained from design pattern data, comprising:

imaging optics which form an optical image of a pattern formed on an inspection target plate on the basis of the design pattern data;

a detected pattern data generator which detects the optical image and generates the detected pattern data;

a repeated pattern area detector which analyzes layout information of the design pattern data as to whether patterns from the same file, in which repeated pattern data is included, exist, detects the plurality of repeated pattern areas from the design pattern data, and registers the repeated pattern areas; and a comparator which sequentially compares the detected pattern data, corresponding to the plurality of repeated pattern areas registered, by the die-to-die inspection, when the plurality of repeated pattern areas are detected by the repeated pattern area detector, wherein, while the imaging optics forms the optical image and the detected pattern generator detects the optical image to generate the detected pattern data, the repeated pattern area detector analyzes the layout information of the design pattern data as to whether the patterns from the same file exist, detects and registers the repeated pattern areas from the design pattern data, and the comparator compares the detected pattern data corresponding to the detected pattern areas registered with the die-to-die comparison.

20. An apparatus according to claim 19, wherein the repeated pattern area detector sets the plurality of repeated pattern areas to be detected to those having rectangular shapes.

21. An apparatus according to claim 19, wherein the repeated pattern area detector sets the plurality of repeated pattern areas to those having a size not smaller than 1 mm square.

22. An apparatus according to claim 19, wherein the repeated pattern area detector detects a size or number of the repeated pattern areas input in advance before detection operation, and thereafter starts the detection operation.

* * * * *